(12) United States Patent
Li et al.

(10) Patent No.: US 9,466,007 B2
(45) Date of Patent: Oct. 11, 2016

(54) METHOD AND DEVICE FOR IMAGE PROCESSING

(71) Applicant: Agency for Science, Technology and Research, Singapore (SG)

(72) Inventors: Zhengguo Li, Singapore (SG); Jinghong Zheng, Singapore (SG); Zijian Zhu, Singapore (SG); Shiqian Wu, Singapore (SG); Susanto Rahardja, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/372,837

(22) PCT Filed: Jan. 18, 2013

(86) PCT No.: PCT/SG2013/000025
§ 371 (c)(1),
(2) Date: Jul. 17, 2014

(87) PCT Pub. No.: WO2013/109192
PCT Pub. Date: Jul. 25, 2013

(65) Prior Publication Data
US 2015/0154468 A1    Jun. 4, 2015

(30) Foreign Application Priority Data

Jan. 18, 2012 (SG) .............................. 201200405-7

(51) Int. Cl.
*G06K 9/00* (2006.01)
*G06K 9/52* (2006.01)
*G06T 5/00* (2006.01)
*G06T 5/20* (2006.01)
*G06T 7/00* (2006.01)

(52) U.S. Cl.
CPC ................. *G06K 9/52* (2013.01); *G06T 5/008* (2013.01); *G06T 5/20* (2013.01); *G06T 7/0042* (2013.01)

(58) Field of Classification Search
CPC . G06T 3/4069; G06T 7/0051; G06T 7/2066; G06K 9/52
USPC ........................................................ 382/197
See application file for complete search history.

(56) References Cited

U.S. PATENT DOCUMENTS

| 6,021,222 | A | * | 2/2000 | Yamagata | G06K 9/4604 382/199 |
| 6,178,205 | B1 | * | 1/2001 | Cheung | H04N 5/145 348/E5.066 |
| 2007/0146232 | A1 | * | 6/2007 | Redert | G06T 7/0051 345/6 |
| 2008/0170615 | A1 | * | 7/2008 | Sekiguchi | H04N 19/00 375/240.14 |
| 2008/0212887 | A1 | * | 9/2008 | Gori | G06K 9/4619 382/248 |
| 2009/0245694 | A1 | * | 10/2009 | Sartor | H04N 7/014 382/300 |

* cited by examiner

*Primary Examiner* — Stephen R Koziol
*Assistant Examiner* — Shaghayegh Azima
(74) *Attorney, Agent, or Firm* — K. David Crockett, Esq.; Niky Economy Syrengelas, Esq.; Crockett & Crockett, PC (57) ABSTRACT

Embodiments provide a method for processing an input image having a plurality of pixels, wherein each pixel has a pixel position. The method may include determining, for each pixel position, a vector based on the input image; and determining, for each pixel position, a detail value for the pixel position based on the determined vectors at a plurality of neighboring pixel positions within a predetermined neighboring block of the pixel position.

11 Claims, 3 Drawing Sheets

METHOD AND DEVICE FOR IMAGE PROCESSING

CROSS-REFERENCE TO RELATED APPLICATIONS

The present application claims the benefit of the Singapore provisional patent application 201200405-7 filed on 18 Jan. 2012, the entire contents of which are incorporated herein by reference for all purposes.

TECHNICAL FIELD

Embodiments relate generally to signal processing. Specifically, embodiments relate to a method and a device for image processing.

BACKGROUND

Many natural scenes have wider dynamic ranges than those that can be recorded by conventional low dynamic range (LDR) imaging systems. An LDR image with small exposure time is under-exposed in the dark scene regions but captures the bright areas well. In contrast, an LDR image with large exposure time is saturated in the bright scene regions but captures the dark areas well. In other words, one LDR image is not able to represent the whole scene. A high dynamic range (HDR) image can be produced to represent the whole scene by sequentially capturing multiple differently exposed LDR images using normal cameras.

One of the challenges of digital image processing is the generation of natural scene which possesses HDR image on a conventional LDR display. Two types of methods were proposed to address this challenge by processing multiple of differently exposed LDR images. The former, called HDR imaging, first generates an HDR image by using these LDR images, and then converts the HDR image into an LDR image so as to visualize the HDR scene via an LDR display. The latter, called exposure fusion, generates an LDR image directly by fusing all LDR images. Exposure fusion is much simpler than HDR imaging, and is more suitable for smart phones and digital cameras where complexity can be an issue. Furthermore, exposure fusion does not require lighting conditions of all images to be the same as required by HDR imaging. Therefore, exposure fusion is more attractive from mobile application point of view.

In exposure fusion of differently exposed LDR images, extraction of fine details is required. Many other applications, such as de-noising of images, tone mapping of HDR images, detail enhancement via, multi-light images and so on, requires extraction of fine details as well.

Fine details can be either noise, e.g. a random pattern with zero mean, or texture, e.g. a repeated pattern with regular structure. There are many methods for extraction of fine details from a single input image, such as the total variation based method, the half quadratic optimization based method, the bilateral filter, etc. However, when there are multiple input images, using these methods directly would be complex because each input image needs to be decomposed individually.

Recently, a quadratic optimization based framework is proposed which can be adopted to extract fine details from a set of images simultaneously. The quadratic optimization problem is solved by using an iterative method which may be complex for mobile devices with limited computational resources. Given the increasing popularity of multi-shot imaging and the intense response from camera manufacturers with their latest digital camera for multi-shot capability, it is desirable to provide a better solution that extracts optimally captured details from a number of individual photographs and integrates them together to form a better image.

SUMMARY

Various embodiments provide a method for processing an input image having a plurality of pixels, wherein each pixel has a pixel position. The method may include determining, for each pixel position, a vector based on the input image; and determining, for each pixel position, a detail value for the pixel position based on the determined vectors at a plurality of neighboring pixel positions within a predetermined neighboring block of the pixel position.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Various embodiments are directed to a method for processing an input image having a plurality of pixels, wherein each pixel has a pixel position. The method may include determining, for each pixel position, a vector based on the input image; and determining, for each pixel position, a detail value for the pixel position based on the determined vectors at a plurality of neighboring pixel positions within a predetermined neighboring block of the pixel position.

The pixel position of each pixel may be represented by an index/coordinate along a horizontal axis of the image and an index/coordinate along a vertical axis of the image, for example. The vector determined for each pixel position may also be referred to as a modified vector.

According to an embodiment, determining the vector for each pixel position may include determining a gradient vector for a pixel at the pixel position of the input image based on intensity values of the input image; and modifying the gradient vector of the pixel at the pixel position to determine the vector for the pixel position.

According to an embodiment, the detail value for the pixel position is determined based on the determined vectors at the plurality of neighboring pixel positions, a first weighting factor and a second weighting factor. The first weighting factor may be determined based on the distance between the pixel position and each of the neighboring pixel positions. The second weighting factor may be determined based on the determined vectors at the neighboring pixel positions.

In an embodiment, each modified vector may include a horizontal vector component along a horizontal axis of the input image and a vertical vector component along a vertical axis of the input image. The modified vectors of the plurality of pixels of the input image may form a vector field (which is also referred to as a modified vector field).

In an embodiment of determining the detail value for each pixel position, a sum vector value for each neighboring pixel position relative to the pixel position is determined for each neighboring pixel position, by summing the vertical vector components of a set of vertical pixel positions and the horizontal vector components of a set of horizontal pixel positions. In an embodiment, the set of vertical pixel positions includes pixel positions between the neighboring pixel position and an intermediate pixel position having the same horizontal position as the neighboring pixel position and having the same vertical position as the pixel position. In an embodiment, the set of horizontal pixel positions includes pixel positions between the intermediate pixel position and the pixel position.

According to an embodiment, the detail value for the pixel position is determined to be a weighted average of the sum vector values for the plurality of neighboring pixel positions within the predetermined neighboring block of the pixel position using the first weighting factor and the second weighting factor. In an embodiment, the second weighting factor is determined based on the sum vector values for the neighboring pixel positions.

In another embodiment, the second weighting factor for the pixel position may further include a perceptual factor of the pixel position for which the detail value is determined. The perceptual factor may be determined based on a variance of the predetermined neighboring block of each pixel position.

In an embodiment, the variance of the predetermined neighboring block of a pixel position may be determined to be the maximum variance of the predetermined neighboring block of the same pixel position among a plurality of input images, wherein the plurality of input images are captured with different exposure time. For example, the plurality of input images may be a sequence of low dynamic range (LDR) images.

In an embodiment, the perceptual factor of the pixel position, for which the detail value is determined, may be determined based on a respective ratio between the variance of the predetermined neighboring block of the pixel position and the respective variance of the predetermined neighboring block of the pixel positions of the plurality of pixels.

According to a further embodiment, the method may further include determining, for each pixel position, a second vector based on a weighted average of the determined vectors (i.e. the determined modified vectors) at the plurality of neighboring pixel positions within the predetermined neighboring block of the pixel position. The second vectors at the plurality of pixel positions of the plurality of pixels may form a second vector field.

In an embodiment, a detail value for each pixel position may be determined based on the modified vectors and the second vectors at the plurality of neighboring pixel positions within the predetermined neighboring block of the pixel position.

In an embodiment, the second vector for each pixel position may be determined based on at least one of the distance between the pixel position and the respective neighboring pixel position, and the difference of the determined modified vectors at the pixel position and the respective neighboring pixel position within the predetermined neighboring block of the pixel position.

Each modified vector may include a horizontal vector component along a horizontal axis of the input image and a vertical vector component along a vertical axis of the input image.

In an embodiment of determining the detail value for each pixel position, a sum vector value for each neighboring pixel position relative to the pixel position is determined for each neighboring pixel position, by summing the vertical vector components of a set of vertical pixel positions and the horizontal vector components of a set of horizontal pixel positions. In an embodiment, the set of vertical pixel positions includes pixel positions between the neighboring pixel position and an intermediate pixel position having the same horizontal position as the neighboring pixel position and having the same vertical position as the pixel position. In an embodiment, the set of horizontal pixel positions includes pixel positions between the intermediate pixel position and the pixel position. For each neighboring pixel position, an auxiliary value may further be determined based on the sum vector value for the neighboring pixel relative to the pixel position, and based on the second vector determined for the pixel position.

According to an embodiment, the detail value for each pixel position is determined based on the auxiliary values at the plurality of neighboring pixel positions within the predetermined neighboring block of the pixel position.

In an embodiment, the detail value for each pixel position is determined to be a weighted average of the auxiliary values determined for the plurality of neighboring pixel positions within the predetermined neighboring block of the pixel position using a first weighting factor, a second weighting factor and a third weighting factor.

According to various embodiment, the first weighting factor may be determined based on the distance between the pixel position and each of the neighboring pixel positions. The second weighting factor may be determined based on the auxiliary values for the neighboring pixel positions. The third weighting factor may be determined based on the second vectors at the pixel position and the neighboring pixel positions.

According to one embodiment, the modified vector for each pixel position may be determined by modifying gradient vectors of a plurality of pixels at the same pixel position of a plurality of input images. The plurality of input images may be captured with different exposure time, e.g. an image sequence of differently exposed LDR images.

The modified vector for each pixel position may be determined to be a weighted average of the gradient vectors of the plurality of pixels at the same pixel position of the plurality of input images. In an embodiment, the weighting may be based on the intensity values of the pixels at the current pixel position and intensity values of a neighboring pixel of the current pixel position along at least one of a horizontal and a vertical axis of the respective input image. In a further embodiment, the weighting may be based on at least one of the deviation of the intensity values of the plurality of pixels and the neighboring pixels from a predetermined intensity value, and a mean intensity value of the respective input image.

According to another embodiment, the modified vector for each pixel position may be determined by modifying gradient vectors of a plurality of pixels at the same pixel position of a plurality of input images, wherein the plurality of input images are captured under different lighting conditions, also referred to as multi-light images.

In determining the modified vector for a pixel position, the largest gradient vector and the second largest gradient vector among gradient vectors of the plurality of pixels at the same pixel position of the plurality of input images are determined. The modified vector for this pixel position may be determined based on one of the largest gradient vector and the second largest gradient vector, dependent on the difference between the largest gradient vector and the second largest gradient vector.

In an embodiment, determining the modified vector based on one of the largest gradient vector and the second largest gradient vector may further include weighing one of the largest gradient vector and the second largest gradient vector, wherein the weighting is based on the intensity value of the pixel at the pixel position and the intensity value of a neighboring pixel of the pixel position along at least one of a horizontal and a vertical axis of the input image having one of the largest gradient vector and the second largest gradient vector. In an embodiment, the weighting is further based on the deviation of the intensity values of the pixel at the pixel position and the neighboring pixel from a predetermined intensity value range.

According to a further embodiment, determining the modified vector for each pixel position may include modifying a gradient vector of a pixel at the same pixel position of a selected image, the selected image being an image having the largest exposure time selected from a plurality of input images captured with different exposure time. The selected image may be the brightest image in the plurality of input images.

The modified vector for each pixel position may be determined to be a weighted gradient vector of the pixel at the same pixel position of the selected image, wherein the weighting is based on the intensity value of the pixel at the pixel position of the selected image and the intensity value of a neighboring pixel of the pixel position along at least one of a horizontal and a vertical axis of the selected image.

In an embodiment, the weighting may be monotonically decreasing with the intensity value of the pixel at the pixel position of the selected image and the intensity value of a neighboring pixel of the pixel position along at least one of a horizontal and a vertical axis of the selected image.

According to an embodiment, the method may further include outputting a detail image, wherein the detail image includes the detail values determined for the pixel positions of the plurality of pixels of the input image in accordance with various embodiments above.

Various embodiments provides a device for processing an input image having a plurality of pixels, wherein each pixel has a pixel position. The device may include a vector determiner configured to determine, for each pixel position, a vector based on the input image; and a detail value determiner configured to determine, for each pixel position, a detail value for the pixel position based on the determined vectors at a plurality of neighboring pixel positions within a predetermined neighboring block of the pixel position.

Various features described above in the context of the image processing method may analogously hold true for the corresponding device for processing an image, and vice versa.

In this context, the image processing device as described in the various embodiments may include a memory which is for example used in the processing carried out by the image processing devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the image processing devices as described in this description may be or may include an image processing circuit.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Figure 1:
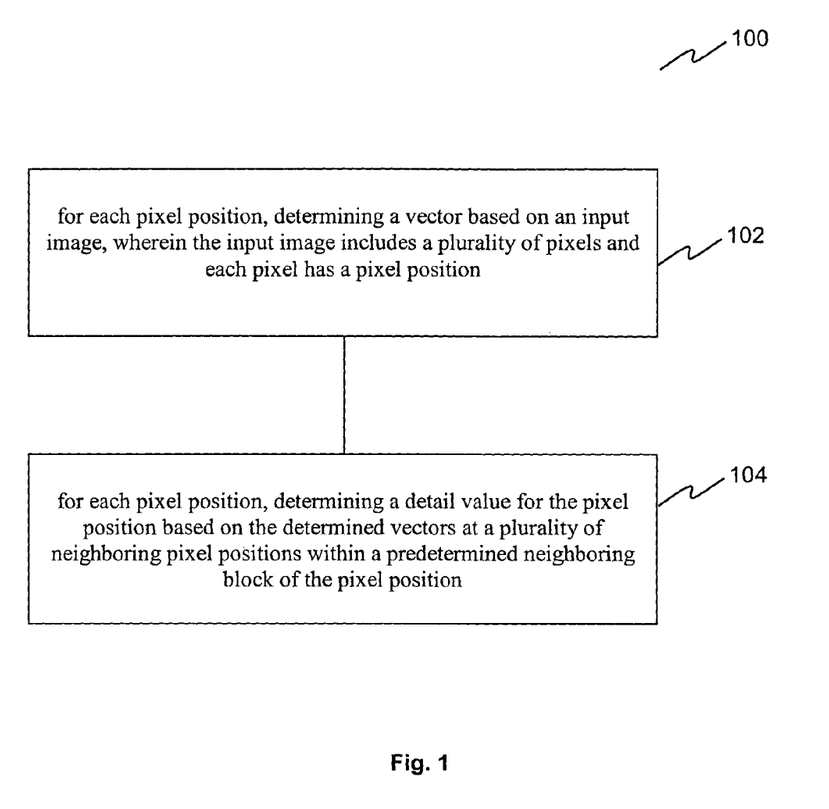
FIG. 1 shows a flowchart illustrating a method for processing an image according to various embodiments.

FIG. 1 shows a flowchart 100 illustrating a method for processing an input image according to various embodiments. The input image includes a plurality of pixels, wherein each pixel has a pixel position.

At 102, for each pixel position, a vector is determined based on the input image.

At 104, for each pixel position, a detail value is determined for the pixel position based on the determined vectors at a plurality of neighboring pixel positions within a predetermined neighboring block of the pixel position.

Various embodiments of the method are described in more detail below.

In the following, a bilateral filter will be described.

For a given input image Z, the intensity value or luminance value of a pixel at a pixel position (i,j) is represented by $Z(i,j)$, wherein i represents an index/coordinate along a horizontal axis of the input image and j represents an index/coordinate along a vertical axis of the input image.

A bilateral filter is applied to the pixels of the input image Z in accordance with the following equation:

$$\hat{Z}_b(i, j) = \sum_{(k,l) \in \Omega_r(i,j)} \frac{w_1(Z, i, j, k, l)}{\sum_{(k,l) \in \Omega_r(i,j)} w_1(Z, i, j, k, l)} Z(k, l), \quad (1)$$

where $\Omega_r = \{(k,l) | |k-i| \leq r, |l-j| \leq r\}$ represents a predetermined neighboring block of the pixel (i,j). $w_1(Z,i,j,k,l)$ is the product of $$\exp\left(-\frac{(k-i)^2 + (l-j)^2}{\sigma_s^2}\right)$$

and $$\exp\left(-\frac{(Z(i,j) - Z(k,l))^2}{\sigma_r^2}\right).$$

$\sigma_s$ and $\sigma_r$ are two parameters. $\hat{Z}_b(i,j)$ represents a base value, and the base values of the plurality of pixels in the input image may form a base image (which may also be referred to as a base layer).

Let $\hat{Z}_d(i,j)$ denote $(Z(i,j)-\hat{Z}_b(i,j))$, it follows that $$\hat{Z}_d(i,j) = \sum_{(k,l)\in\Omega_r(i,j)} \frac{w_1(Z,i,j,k,l)}{\sum_{(k,l)\in\Omega_r(i,j)} w_1(Z,i,j,k,l)}(Z(i,j)-Z(k,l)). \quad (2)$$

$\hat{Z}_d(i,j)$ represents a detail value, and the detail values determined for the pixel positions of the plurality of pixels in the input image may form a detail image (also referred to as a detail layer). The detail values may represent information about fine details of the input image in some embodiments, and may represent information about noise of the input image in other embodiments.

The gradient vector of the pixel $Z(i,j)$ is defined as $$\nabla Z_x(i,j)=Z(i+1,j)-Z(i,j), \nabla Z_y(i,j)=Z(i,j+1)-Z(i,j)$$

wherein $\nabla Z_x(i,j)$ represents a horizontal gradient vector component along a horizontal axis x of the input image, and $\nabla Z_y(i,j)$ represents a vertical gradient vector component along a vertical axis y of the input image. The gradient vectors of a plurality of pixels in the input image Z forms a gradient field.

Based on the gradient field, a sum vector field is formed. For example, the sum vector represented by $\vec{G}(\nabla Z,i,j,k,l)$ includes a horizontal component and a vertical component in accordance with the following equations:

$$G_x(\nabla Z,i,j,k,l) = \begin{cases} \sum_{q=k}^{i-1} \nabla Z_x(q,j); & \text{if } i > k \\ -\sum_{q=i}^{k-1} \nabla Z_x(q,j): & \text{if } i < k \\ 0; & \text{if } i = k \end{cases},$$

$$G_y(\nabla Z,i,j,k,l) = \begin{cases} \sum_{q=l}^{j-1} \nabla Z_y(k,q); & \text{if } j > l \\ -\sum_{q=j}^{l-1} \nabla Z_y(k,q): & \text{if } j < l \\ 0; & \text{if } j = l \end{cases}.$$

It can be verified that $$Z(i,j) - Z(k,l) = \sum_{q\in\{x,y\}} G_q(\nabla Z,i,j,k,l).$$

In other words, $\hat{Z}_d(i,j)$ can also be computed as $$\hat{Z}_d(i,j) = \sum_{(k,l)\in\Omega_r(i,j)} \frac{w_2(\nabla Z,i,j,k,l)}{\sum_{(k,l)\in\Omega_r(i,j)} w_2(\nabla Z,i,j,k,l)} \sum_{q\in\{x,y\}} G_q(\nabla Z,i,j,k,l), \quad (3)$$

wherein $w_2(\nabla Z,i,j,k,l)$ may be the product of $$\exp\left(-\frac{(k-i)^2+(l-j)^2}{\sigma_s^2}\right)$$

and $$\exp\left(-\frac{\left(\sum_{q\in\{x,y\}} G_q(\nabla Z,i,j,k,l)\right)^2}{\sigma_r^2}\right).$$

The bilateral filter in accordance with equation (3) above is in the gradient domain. This bilateral filter is applied to a vector field of the input image wherein an exemplary vector field is the gradient field $\nabla Z$ of the input image. In other embodiments, other types of vector field may be used in the bilateral filter, as will be described in various embodiments below.

Defining a vector field V, also referred to as a modified vector field, a bilateral filter applied to the vector field may be carried out in accordance with the following equation:

$$\hat{V}_d(i,j) = \sum_{(k,l)\in\Omega_r(i,j)} \frac{w_2(V,i,j,k,l)}{\sum_{(k,l)\in\Omega_r(i,j)} w_2(V,i,j,k,l)} \sum_{q\in\{x,y\}} G_q(V,i,j,k,l), \quad (4)$$

wherein $\hat{V}_d(i,j)$ represents the detail value determined at the pixel position $(i,j)$. The weightage $w_2(V,i,j,k,l)$ may include a first weighting factor $$\exp\left(-\frac{(k-i)^2+(l-j)^2}{\sigma_s^2}\right)$$

and a second weighting factor $$\exp\left(-\frac{\left(\sum_{q\in\{x,y\}} G_q(V,i,j,k,l)\right)^2}{\sigma_r^2}\right).$$

In an example, $w_2(V,i,j,k,l)$ is the product of the first weighting factor and the second weighting factor.

Each modified vector $\vec{V}(i,j)=(V_x(i,j), V_y(i,j))$ of the vector field may include a horizontal vector component $V_x(i,j)$ along the horizontal axis of the input image and a vertical vector component $V_y(i,j)$ along the vertical axis of the input image. The modified vectors of the plurality of pixels of the input image form the modified vector field V.

The vector field V may be determined based on the input image according to different methods in different applications of the bilateral filter.

In an embodiment according to equation (4), the detail value $\hat{V}_d(i,j)$ for the pixel position $(i,j)$ is determined based on modified vectors at the plurality of neighboring pixel positions, the first weighting factor and the second weighting factor. The first weighting factor $$\exp\left(-\frac{(k-i)^2+(l-j)^2}{\sigma_s^2}\right)$$

may be determined based on the distance between the pixel position $(i,j)$ and each of the neighboring pixel positions $(k,l)$. The second weighting factor $$\exp\left(-\frac{\left(\sum_{q\in\{x,y\}}G_q(V,i,j,k,l)\right)^2}{\sigma_r^2}\right)$$

may be determined based on the modified vectors V at the neighboring pixel positions.

Accordingly, $$G_x(V,i,j,k,l) = \begin{cases} \sum_{q=k}^{i-1} V_x(q,j); & \text{if } i > k \\ -\sum_{q=i}^{k-1} V_x(q,j); & \text{if } i < k \\ 0; & \text{if } i = k \end{cases}$$

$$G_y(V,i,j,k,l) = \begin{cases} \sum_{q=l}^{j-1} V_y(k,q); & \text{if } j > l \\ -\sum_{q=j}^{l-1} V_y(k,q); & \text{if } j < l \\ 0; & \text{if } j = l \end{cases}.$$

In accordance with the above equations, a sum vector value $$\sum_{q\in\{x,y\}}G_q(V,i,j,k,l)$$

for each neighboring pixel position (k,l) relative to the pixel position (i,j) is determined for each neighboring pixel position (k,l), by summing the vertical vector components of a set of vertical pixel positions and the horizontal vector components of a set of horizontal pixel positions. In an embodiment, the set of vertical pixel positions includes pixel positions between the neighboring pixel position and an intermediate pixel position having the same horizontal position as the neighboring pixel position and having the same vertical position as the pixel position. In an embodiment, the set of horizontal pixel positions includes pixel positions between the intermediate pixel position and the pixel position.

According to an embodiment of equation (4), the detail value for the pixel position (i,j) is determined to be a weighted average of the sum vector values $$\sum_{q\in\{x,y\}}G_q(V,i,j,k,l)$$

for the plurality of neighboring pixel positions (k,l) within the predetermined neighboring block of the pixel position (i,j) using the first weighting factor $$\exp\left(-\frac{(k-i)^2+(l-j)^2}{\sigma_s^2}\right)$$

and the second weighting factor $$\exp\left(-\frac{\left(\sum_{q\in\{x,y\}}G_q(V,i,j,k,l)\right)^2}{\sigma_r^2}\right).$$

In an embodiment, the second weighting factor $$\exp\left(-\frac{\left(\sum_{q\in\{x,y\}}G_q(V,i,j,k,l)\right)^2}{\sigma_r^2}\right)$$

is determined based on the sum vector values $$\sum_{q\in\{x,y\}}G_q(V,i,j,k,l)$$

for the neighboring pixel positions.

In accordance with the equation (4), a bilateral filter in gradient domain is provided. The input to the bilateral filter is the vector field, wherein the vector field may be various types of vector fields depending on different scenario in which the bilateral filter is to be applied. The vector field may be generated in different manner for different applications, and some examples of the vector field will be described below. The output of the bilateral filter of equation (4) is an image having fine details, also referred to as a detail image or a detail layer. Whereas for the bilateral filter of equation (1), its input is an input image to be filtered and its output is a reconstructed image formed by homogeneous regions with sharp edges.

In the following, a perceptual bilateral filter will be described.

According to another embodiment, the bilateral filter in gradient domain used for determining the detail value may be further enhanced by taking a feature of human visual system (HVS) into consideration. It is observed that the HVS is more sensitive to fine details in less complex regions, i.e. smoother regions. Based on this observation, a perceptual weight (which may also be referred to as a perceptual factor) may be introduced to the bilateral filter of equation (4) such that $\hat{w}_2(V,i,j,k,l)$ is the product of the first weighting factor $$\exp\left(\frac{-(k-i)^2+(l-j)^2}{\sigma_s^2}\right)$$

and the second weighting factor $$\exp\left(-\frac{\left(w_g(i,j)\sum_{q\in\{x,y\}}G_q(V,i,j,k,l)\right)^2}{\sigma_r^2}\right).$$

In this embodiment, the second weighting factor further includes a perceptual factor $w_g(i,j)$ of the pixel position (i,j) for which the detail value is to be determined. The perceptual factor $w_g(i,j)$ may be determined based on a variance of the predetermined neighboring block of each pixel position.

In an embodiment, the variance of the predetermined neighboring block of a pixel position may be determined to be the maximum variance of the predetermined neighboring block of the same pixel position among a plurality of input images, wherein the plurality of input images are captured with different exposure time. For example, the plurality of input images may be a sequence of LDR images.

Taking a set of N differently exposed input images $Z_m(1 \leq m \leq N)$ as an example to illustrate the determination of the perceptual factor $w_g(i,j)$, the value of $w_g(i,j)$ is computed using all luma components $Y_m(i,j)(1 \leq m \leq N)$ of the input images. Due to different exposures, a well exposed pixel in one input image could be under/over-exposed in another input image. Let $\sigma_{Y_m,\rho}^2(i,j)$ represent the variance of a neighboring block of the pixel position (i,j) with the radius as $\rho$. The value of $\rho$ is selected as 4, in an example. It is understood that the value of $\sigma_{Y_m,\rho}^2(i,j)$ is different for different input images indexed by m. It is noted that there may be overlapping among neighboring blocks. The objective is to prevent possible blocking artifacts from appearing in a resulted image.

Gradient magnitude becomes larger when a pixel gets better exposed, and decreases as the pixel becomes under/over-exposed. Therefore, the largest value of $\sigma_{Y_m,\rho}^2(i,j)$ along all m's is chosen to represent the overall local variance of pixel (i,j). The value of $w_g(i,j)$ is then determined according to the following equation $$w_g(i, j) = \frac{1}{M_1 M_2} \sum_{p=1}^{M_1} \sum_{q=1}^{M_2} \frac{2 \max_{1 \leq m \leq N} \{\sigma_{Y_m,\rho}^2(i, j)\} + c_1}{2 \max_{1 \leq m \leq N} \{\sigma_{Y_m,\rho}^2(p, q)\} + c_1}, \quad (5)$$

where the value of $c_1$ may be selected as 0.03*256*256 in an example. $M_1$ and $M_2$ represent the width and the height of the input image, respectively.

According to the above embodiment, the perceptual factor $w_g(i,j)$ of the pixel position (i,j) may be determined based on a respective ratio between the variance of the predetermined neighboring block of the pixel position (i,j) and the respective variance of the predetermined neighboring block of the pixel positions (p, q) of the plurality of pixels.

Illustratively, define $$\sigma_r' = \frac{\sigma_r}{\sqrt{w_g(i, j)}}$$

representing a local content adaptive indicator, the second weighting factor $$\exp\left(-\frac{w_g(i, j)\left(\sum_{q \in \{x,y\}} G_q(V, i, j, k, l)\right)^2}{\sigma_r^2}\right)$$

can be represented as $$\exp\left(-\frac{\left(\sum_{q \in \{x,y\}} G_q(V, i, j, k, l)\right)^2}{(\sigma_r')^2}\right).$$

When the pixel (i,j) is in a complex region, the value of $w_g(i,j)$ is large and the value of the local content adaptive factor $\sigma_r'$ is small. When the pixel (i,j) is in a flat area, the value of $w_g(i,j)$ is small and the value of the local content adaptive factor $\sigma_r'$ is large. Accordingly, sharp edges are excluded and fine details are preserved better in the detail image using the second weighting factor $$\exp\left(-\frac{\left(\sum_{q \in \{x,y\}} G_q(V, i, j, k, l)\right)^2}{(\sigma_r')^2}\right)$$

in equation (4). Halo artifacts could also be avoided from appearing in the final image.

With the introduction of the perceptual factor $w_g(i,j)$ into the second weighting factor, a perceptually weighted bilateral filter in gradient domain is achieved in accordance with equation (4). It is shown that the perceptually weighted bilateral filter can be adopted to improve visual quality of final images.

In the following, a trilateral filter will be described.

According to a further embodiment, the method may further include determining, for each pixel position, a second vector based on a weighted average of the modified vectors at the plurality of neighboring pixel positions within the predetermined neighboring block of the pixel position. The second vectors at the plurality of pixel positions of the plurality of pixels may form a second vector field.

Based on the modified vector field $\vec{V}(i,j)=(V_x(i,j), V_y(i,j))$ described in various embodiments above, a second vector field $U(i,j)$ is defined in accordance with the following equation:

$$U(i, j) = \sum_{(k,l) \in \Omega_r(i,j)} \frac{w_3(V, i, j, k, l)}{\sum_{(k,l) \in \Omega_r(i,j)} w_3(V, i, j, k, l)} V(k, l), \quad (6)$$

where $w_3(V,i,j,k,l)$ is the product of $$\exp\left(-\frac{(k-i)^2 + (l-j)^2}{\sigma_s^2}\right) \text{ and } \exp\left(-\frac{\|V(k, l) - V(i, j)\|^2}{\sigma_r^2}\right).$$

In an embodiment, the second vector $U(i,j)$ for each pixel position (i,j) may be determined based on at least one of the distance between the pixel position and the respective neighboring pixel position (e.g. as in the weighting factor $$\exp\left(-\frac{(k-i)^2 + (l-j)^2}{\sigma_s^2}\right)$$

of $w_3(V,i,j,k,l)$), and the difference of modified vectors at the pixel position (i,j) and the respective neighboring pixel position (k,l) within the predetermined neighboring block of the pixel position (i,j) (e.g. as in the weighting factor $$\exp\left(-\frac{\|V(k, l) - V(i, j)\|^2}{\sigma_r^2}\right)$$

of $w_3(V,i,j,k,l)$).

In an embodiment, a detail value for each pixel position may be determined based on the modified vectors and the second vectors at the plurality of neighboring pixel positions (k,l) within the predetermined neighboring block of the pixel position (i,j).

For example, the detail value for each pixel position (i,j) may be determined in accordance with the following equation:

$$\hat{V}_d(i,j) = -\sum_{(k,l)\in\Omega_r(i,j)} \frac{w_4(U,V,i,j,k,l)}{\sum_{(k,l)\in\Omega_r(i,j)} w_4(U,V,i,j,k,l)} \Phi(U,V,i,j,k,l), \quad (7)$$

where $w_4(U,V,i,j,k,l)$ is the product of the first weighting factor $$\exp\left(-\frac{(k-i)^2+(l-j)^2}{\sigma_s^2}\right),$$

the second weighting factor $$\exp\left(-\frac{\Phi^2(U,V,i,j,k,l)}{\sigma_r^2}\right)$$

and a third weighting factor $\Psi(U,i,j,k,l)$.

$$\Phi = \sum_{q\in\{x,y\}} G_q(V,i,j,k,l) - U_x(i,j)(k-i) - U_y(i,j)(l-j),$$

$$\Psi = \begin{cases} 1; & \text{if } \|U(k,l) - U(i,j)\| < \xi \\ 0; & \text{otherwise} \end{cases},$$

where $\xi$ is a threshold.

Similar to the description above, for each pixel position, a sum vector value $$\sum_{q\in\{x,y\}} G_q(V,i,j,k,l)$$

is determined for each neighboring pixel position (k,l) relative to the pixel position (i,j). For each neighboring pixel position (k,l), an auxiliary value $\Phi(U,V,i,j,k,l)$ may be determined based on the sum vector value $$\sum_{q\in\{x,y\}} G_q(V,i,j,k,l)$$

and based on the second vector $U(i,j)$ determined for the pixel position (i,j) in the equation of $\Phi$ above.

According to an embodiment, the detail value for each pixel position is determined based on the auxiliary values $\Phi(U,V,i,j,k,l)$ at the plurality of neighboring pixel positions within the predetermined neighboring block of the pixel position.

According to the embodiment of equation (7), the detail value for each pixel position (i,j) is determined to be a weighted average of the auxiliary values $\Phi(U,V,i,j,k,l)$ determined for the plurality of neighboring pixel positions (k,l) within the predetermined neighboring block of the pixel position (i,j) using the first weighting factor $$\exp\left(-\frac{(k-i)^2+(l-j)^2}{\sigma_s^2}\right),$$

the second weighting factor $$\exp\left(-\frac{\Phi^2(U,V,i,j,k,l)}{\sigma_r^2}\right)$$

and the third weighting factor $\Psi(U,i,j,k,l)$.

According to various embodiment, the first weighting factor $$\exp\left(-\frac{(k-i)^2+(l-j)^2}{\sigma_s^2}\right)$$

may be determined based on the distance between the pixel position and each of the neighboring pixel positions. The second weighting factor $$\exp\left(-\frac{\Phi^2(U,V,i,j,k,l)}{\sigma_r^2}\right)$$

may be determined based on the auxiliary values for the neighboring pixel positions. The third weighting factor $\Psi(U,i,j,k,l)$ may be determined based on the second vectors at the pixel position and the neighboring pixel positions.

In an embodiment, the third weighting factor $\Psi(U,i,j,k,l)$ is determined based on the difference of the second vectors at the pixel position (i,j) and the respective neighboring pixel position (k,l) within the predetermined neighboring block of the pixel position (i,j).

In accordance with the equation (7), a trilateral filter in gradient domain is obtained. The input to the trilateral filter is the vector field, wherein the vector field may be various types of vector fields depending on different scenario in which the bilateral filter is to be applied. The vector field may be generated in different manner for different applications, and some examples of the vector field will be described below. The output of the bilateral filter of equation (7) is an image having fine details, also referred to as a detail image or a detail layer. Whereas for the bilateral filter of equation (1), its input is an input image to be filtered and its output is a reconstructed image formed by homogeneous regions with sharp edges.

In another embodiment, the trilateral filter may also include a perceptual factor as described above in the second weighting factor.

The bilateral filter, the perceptual bilateral filter and the trilateral filter described in various embodiments above may be applied to various applications, such as exposure fusion of differently exposed LDR images, de-noising of images, detail enhancement via multi-light images, tone mapping of high dynamic range (HDR) images, and so on. In the following, various embodiments in which the bilateral filter is applied are described in more detail in which a respective vector field or modified vector filed is determined according to the respective application. It is understood that the perceptual bilateral filter and the trilateral filter may be applied in a similar way in other embodiments. In accordance with various embodiments of the bilateral filter, a modified vector field is determined according to various embodiments.

In the following, exposure fusion of differently exposed images will be described.

The objective of exposure fusion is to generate a single intermediate image which is more detailed and natural. To prevent seams in the merged image, exposure fusion algorithms usually include smoothing effect of the Laplacian pyramid, which may cause fine details to be lost or blurred in the output images. For this reason, exposure fusion may not preserve local detail as good as the HDR imaging.

The method according to various embodiment can preserve local detail, and can be applied to extract fine details from a plurality of input images simultaneously.

According to one embodiment, the modified vector for each pixel position may be determined by modifying gradient vectors of a plurality of pixels at the same pixel position of a plurality of input images. The plurality of input images may be captured with different exposure time, e.g. an image sequence of differently exposed LDR images.

Let the plurality of input images be denoted as $Z_m(1 \leq m \leq N)$, and luminance value or intensity value of pixels be denoted as $Y_m(i,j)(1 \leq m \leq N)$. Normally, the gradient of a pixel with the largest absolute value along different exposures corresponds to the most desirable detail at the pixel position of the pixel. However, there is a high likelihood that the maximum gradient is noisy, especially in dark regions of an HDR scene. According to an embodiment, the modified vector field V may be determined using a weighted average of gradient vectors over all exposures.

In accordance with an embodiment, the modified vector $\vec{V}(i,j)=(V_x(i,j), V_y(i,j))$ for each pixel position (i,j) may be determined to be a weighted average of the gradient vectors of the plurality of pixels at the same pixel position (i,j) of the plurality of input images.

Define the gradient vector $(\nabla Y_{m,x}(i,j), \nabla Y_{m,y}(i,j))$ at the pixel position (i,j) of the input image $Z_m$ as $$\nabla Y_{m,x}(i,j) = Y_m(i+1,j) - Y_m(i,j), \nabla Y_{m,y}(i,j) = Y_m(i,j+1) - Y_m(i,j)$$

In another embodiment, the modified vector field $\vec{V}(i,j)=(V_x(i,j), V_y(i,j))$ may be determined based on a weighted average of the gradient vectors of the plurality of pixels at the same pixel position (i,j) of the plurality of input images in log domain in accordance with the following equation:

$$V_q(i,j) = \frac{\sum_{m=1}^{N} W_{m,q}(i,j) \nabla \log(Y_{m,q}(i,j))}{\sum_{m=1}^{N} W_{m,q}(i,j)}, q = x, y. \quad (8)$$

wherein the weighting factors of the gradient vectors are determined in accordance with the following equation $$W_{m,x}(i,j) = w_5(Y_m(i,j)) w_5(Y_m(i+1,j)) \bar{Y}_m^\gamma,$$

$$W_{m,y}(i,j) = w_5(Y_m(i,j)) w_5(Y_m(i,j+1)) \bar{Y}_m^\gamma, \quad (9)$$

where $\bar{Y}_m$ is the mean value of $Y_m(i,j)$. $\gamma$ is a constant, and its value is selected as 2 in one example. In an example, the values of $\sigma_s$ and $\sigma_r$ may be chosen as 2 and 1.25, respectively.

In an embodiment, the weighting factor $W_{m,q}(i,j)$ may be determined based on the intensity values of the pixels at the current pixel position (i,j) and intensity values of a neighboring pixel of the current pixel position along at least one of a horizontal (e.g. the neighboring pixel at (i+1,j)) and a vertical axis (e.g. the neighboring pixel at (i,j+1)) of the respective input image.

In a further embodiment, the weighting factor $W_{m,q}(i,j)$ may be determined based on at least one of the deviation of the intensity values (e.g. luminance values) of the plurality of pixels and the neighboring pixels from a predetermined intensity/luminance value, and a mean intensity/luminance value $\bar{Y}_m$ of the respective input image. The predetermined intensity/luminance value may be a middle value of the intensity/luminance value range of the input images.

In an embodiment, the weighting function $w_5(z)$ is defined as $$w_5(z) = \begin{cases} z+1; & \text{if } z \leq 127 \\ 256-z; & \text{otherwise} \end{cases}.$$

The weighting function $w_5(z)$ may represent the deviation of the intensity value z (e.g. luminance value) from a predetermined intensity/luminance value 127. In this exemplary embodiment wherein the intensity/luminance value range of input images is [0, 255], and the predetermined intensity/luminance value may be determined to be the middle value 127.

In another embodiment wherein the intensity/luminance value of the input image is in a range of [0, 65535], the predetermined intensity/luminance value may be determined to be 32767. In other embodiments wherein the input image is a 32-bit or 64 bit image, the predetermined intensity/luminance value may be determined to be the middle value of the intensity/luminance range accordingly. The weighting function $w_5(z)$ may be implemented using other forms of functions in other embodiments.

The function of $W_{m,x}(i,j)$ and $W_{m,y}(i,j)$ in accordance with equation (9) are used to reduce possible noise from the modified vector field.

By applying the modified field determined in equation (8) to the equation (4) or (7), fine details, i.e. detail value for each pixel position, can be simultaneously extracted from the input images $Z_m(1 \leq m \leq N)$ using the bilateral filter or trilateral filter described in various embodiments above, thereby obtaining a detail image/layer $V_d$ for the input images $Z_m(1 \leq m \leq N)$.

In an embodiment, an intermediate image may be determined by exposure fusion of the input images $Z_m(1 \leq m \leq N)$. The extracted details, i.e. the detail image/layer $V_d$ may be added (e.g. through a multiplication) to the intermediate image that is fused to generate the final image. The detail image/layer $V_d$ is used to enhance the intermediate image determined using exposure fusion schemes. During the enhancement of the intermediate image, the detail image/layer $V_d$ may be determined according to various embodiments above, or may be determined using other existing methods.

Figure 2:
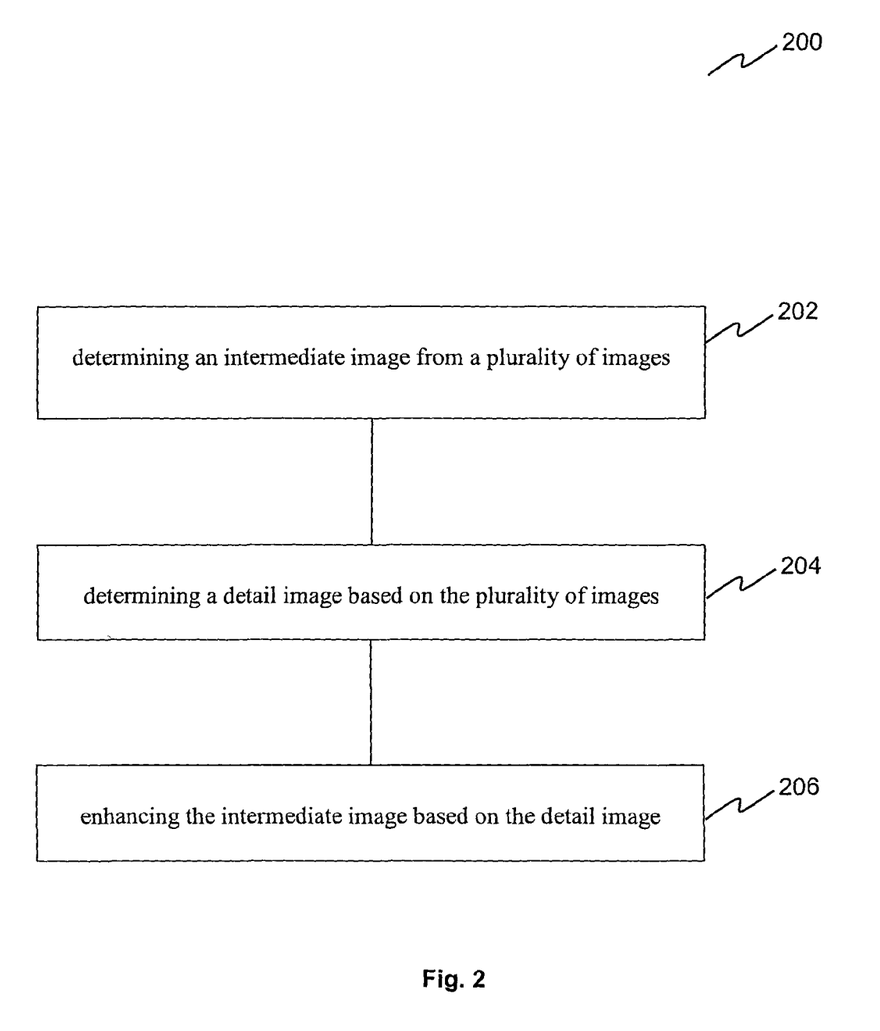
FIG. 2 shows a flowchart illustrating a method of enhancing an intermediate image according to an embodiment.

FIG. 2 shows a flowchart 200 illustrating a method of enhancing an intermediate image according to an embodiment.

At 202, an intermediate image may be determined from a plurality of input images. The plurality of input images may be differently exposed.

At 204, a detail image may be determined based on the plurality of input images. The detail image may be determined in accordance with the embodiments above, or may be determined using other existing methods.

At 206, the intermediate image is enhanced based on the detail image.

In accordance with the method of various embodiments, the desired fine details of all input images can be extracted simultaneously, i.e., by using the bilateral filter once, compared to the existing method wherein each input image need to be decomposed by using the existing bilateral filter. When the number of input images is large, the bilateral filter of various embodiments can be applied to reduce the computational cost on the extraction of fine details from the input images. Moreover, the exposure fusion scheme according to the embodiment extracts fine details from all input images and then adds them to the intermediate image. As such, fine details are well preserved in the final image.

In the following, detail enhancement via multi-light images will be described.

According to another embodiment, the modified vector for each pixel position may be determined by modifying gradient vectors of a plurality of pixels at the same pixel position of a plurality of input images, wherein the plurality of input images are captured under different lighting conditions, also referred to as multi-light images.

Multi-light images that capture the same scene under different lighting positions can collectively provide a much more detailed description of the scene than a single image. The information lost in one image can be complemented by the information from other images. This feature of multi-light images can be applied to enhance the shape and surface details of a scene. The bilateral filter, perceptual bilateral filter and trilateral filter in various embodiments above may be adopted to extract fine details from multi-light images simultaneously.

Let input images be denoted as $Z_m (1 \leq m \leq N)$ and the luminance/intensity components of the pixel at (i,j) be denoted as $Y_m(i,j)(1 \leq m \leq N)$. As the contents of an image are usually indicated by the intensity variation, the maximal gradient at each location around the input images may be used for the construction of vector field. However, shading information from different images could also be included in the vector field, as a shadow often has large intensity variations at its boundary. As a result, shadow regions will cause artifacts in the final image. To remove the intensity variation caused by shadow edges from the vector field, a shadow detection approach can be adopted to divide an image into shadow and non-shadow areas; the gradients near shadow edges are not included in the vector field. However, it can be complex to detect shadows for each input image.

A simple method according to an embodiment is adopted to determine the modified vector field $\vec{V}(i,j)$. The value of the horizontal vector component $V_x(i,j)$ is determined according to $$V_x(i,j) = \begin{cases} g_x(m^{x,2}(i,j), i, j), & \text{if } |\nabla Y_{m^{x,1},x}(i,j)| > 3|\nabla Y_{m^{x,2},x}(i,j)| \\ g_x(m^{x,1}(i,j), i, j), & \text{otherwise} \end{cases} \quad (10)$$

The value of the vertical vector component $V_y(i,j)$ is determined according to $$V_y(i,j) = \begin{cases} g_y(m^{y,2}(i,j), i, j), & \text{if } |\nabla Y_{m^{y,1},y}(i,j)| > 3|\nabla Y_{m^{y,2},y}(i,j)| \\ g_y(m^{y,1}(i,j), i, j), & \text{otherwise} \end{cases} \quad (11)$$

wherein $m^{q,1}(i,j)$ and $m^{q,2}(i,j)$ (q=x, y) denote the indices of two input images with the largest gradient and the second largest gradient at position (i,j) along direction x and y, respectively. The functions $g_x(k,i,j)$ and $g_y(k,i,j)$ are defined as $$g_x(m,i,j) = w_6(Y_m(i,j))w_6(Y_m(i+1,j))\nabla Y_{m,x}(i,j),$$

$$g_y(m,i,j) = w_6(Y_m(i,j))w_6(Y_m(i,j+1))\nabla Y_{m,y}(i,j), \quad (12)$$

In an embodiment, the weighting function $w_6(z)$ is determined as $$w_6(z) = \begin{cases} z/30; & \text{if } z \leq 30 \\ (255-z)/30; & \text{if } z > 225 \\ 1 & \text{if } 225 \geq z > 30 \end{cases} \quad (13)$$

In determining the modified vector for a pixel position according to the above embodiments, the largest gradient vector and the second largest gradient vector among gradient vectors of the plurality of pixels at the same pixel position of the plurality of input images are determined. The modified vector for this pixel position may be determined based on one of the largest gradient vector and the second largest gradient vector, dependent on the difference between the largest gradient vector and the second largest gradient vector. For example, as shown in equations (10) and (11) above, if the difference between the largest gradient vector and the second largest gradient vector is too high, the modified vector is determined based on the second largest gradient vector. Otherwise, the modified vector is determined based on the largest gradient vector.

In accordance with an embodiment, determining the modified vector based on one of the largest gradient vector and the second largest gradient vector may further include weighing one of the largest gradient vector and the second largest gradient vector, wherein the weighting is based on the intensity/luminance value of the pixel at the pixel position and the intensity/luminance value of a neighboring pixel of the pixel position along at least one of a horizontal and a vertical axis of the input image having one of the largest gradient vector and the second largest gradient vector (e.g. as shown in equation (12)).

In an embodiment, the weighting is further based on the deviation of the intensity values of the pixel at the pixel position and the neighboring pixel from a predetermined intensity value range (e.g. as shown in equation (13)). The predetermined intensity value range may be a range in the middle of the intensity value range of the input image. For example, in the embodiment of equation (13), the predetermined intensity value range is selected as (30, 225]. The weighting function $w_6(z)$ may be implemented using other forms of functions in other embodiments.

The modified vector field determined according to equations (10) and (11) may be applied to the bilateral filter of equation (4) or trilateral filter of equation (7). In an example, the values of r, $\sigma_s$ and $\sigma_r$ may be chosen as 2, 4, and 0.5, respectively.

The method of various embodiments may be used for details enhancement of multi-light images. In the conventional scheme, the base layer is calculated as a weighted sum of the input images. Even though users can control the strength and location of shadows through adjusting the weight factors of input images, the shadows of the final images are a little messy. Compared with the conventional scheme, the method of various embodiments can provide natural shading information in the final output images. In addition, when there are multiple input images, the bilateral filter of various embodiments can be used to reduce the time on extraction of fine details.

In the following, de-noising of differently exposed images will be described.

The bilateral filter and trilateral filter of various embodiments above may be used for de-nosing of differently exposed LDR images. The filter of various embodiments can be applied to remove noise from selected areas of an image.

A set of differently exposed LDR images are usually taken from an HDR scene and they are used to synthesize an image with desired details. To capture an HDR scene under low lighting condition, cameras are usually set to high ISO (International Organization for Standardization) settings so as to reduce motion blur of the differently exposed LDR images. However, high ISO setting causes noise on LDR images and this eventually degrades the quality of the final HDR image.

A weighted frame averaging method has been used to reduce noise from differently exposed LDR images. Conventional methods are based on an observation that an image with a longer exposure time, i.e., a brighter image, normally includes less noise. All LDR images are firstly arranged according to their exposure times. Since the knowledge of exposures might not be available in some applications, the average intensity values of an image are used in the scheme. Each LDR image is corrected using several successive LDR images with longer exposures in the same sequence. Instead of mapping all LDR images to the HDR domain, all LDR images with longer exposures are first calibrated according to the image to be de-noised by using the IMFs (Intrinsic Mode Functions). All mapped LDR images and the image to be de-noised are then averaged with a predefined weighting function to generate the corrected LDR image. With the observation that LDR images with longer exposures include less noise, the weighting function is designed such that higher weights are given to pixels captured with longer exposure times.

The noise in the LDR image with a shorter exposure can thus be reduced and the noise in the corresponding areas of synthesized image is also effectively removed. Conventional methods can be applied to reduce noise from images with smaller exposure times well. However, the conventional methods may not be able to remove noise from the brightest image which could also include noise, especially in dark areas.

The bilateral filter and trilateral filter of various embodiments may be applied to remove noise only from dark areas of the brightest image, according to an embodiment.

In an embodiment, the modified vector field j) may be determined as $$V_x(i,j)=w_7(Z_1(i+1,j))w_7(Z_1(i,j))\nabla Z_{1,x}(i,j);$$

$$V_y(i,j)=w_7(Z_1(i,j+1))w_7(Z_1(i,j))\nabla Z_{1,y}(i,j). \quad (14)$$

According to this embodiment, the modified vector $\vec{V}(i,j)$ for each pixel position (i,j) may be determined by modifying a gradient vector of a pixel at the same pixel position (i,j) of a selected image $Z_1$, wherein the selected image $Z_1$ is an image having the largest exposure time selected from a plurality of input images captured with different exposure time. The selected image may be the brightest image in the plurality of input images.

In an embodiment, the weighting function $w_7(z)$ may be determined as $$w_7(z) = \frac{1}{1+\exp((z-128)/8)} \quad (15)$$

In accordance with the embodiment of equation (14), the modified vector $\vec{V}(i,j)$ for each pixel position may be determined to be a weighted gradient vector of the pixel at the same pixel position (i,j) of the selected image $Z_1$, wherein the weighting is based on the intensity value of the pixel at the pixel position (i,j) of the selected image and the intensity value of a neighboring pixel of the pixel position along at least one of a horizontal (e.g. the neighboring pixel at (i+1, j)) and a vertical (e.g. the neighboring pixel at (i, j+1)) axis of the selected image.

In an embodiment, the weighting may be monotonically decreasing with the intensity value of the pixel at the pixel position of the selected image and the intensity value of a neighboring pixel of the pixel position along at least one of a horizontal and a vertical axis of the selected image. For example, the weighting function $w_7(z)$ is a monotonically decreasing function. The weighting function $w_7(z)$ may be implemented using other forms of functions in other embodiments.

By applying the modified vector field of equation (14) to the bilateral filter of equation (4), the noise is extracted from the vector field $\vec{V}(i,j)$. In an example, the values of r, $\sigma_s$ and $\sigma_r$ are chosen as 2, 4, and 26, respectively.

In existing de-noising scheme based on the conventional bilateral filter, the entire image is de-noised, i.e., the value of $w_7(z)$ is always 1. In contrast, the method of the embodiment can be used to remove noise from dark areas of the input image, e.g. the brightest LDR image from a set of differently exposed LDR images, and at the same time keep sharpness in bright regions of the input image.

Figure 3:
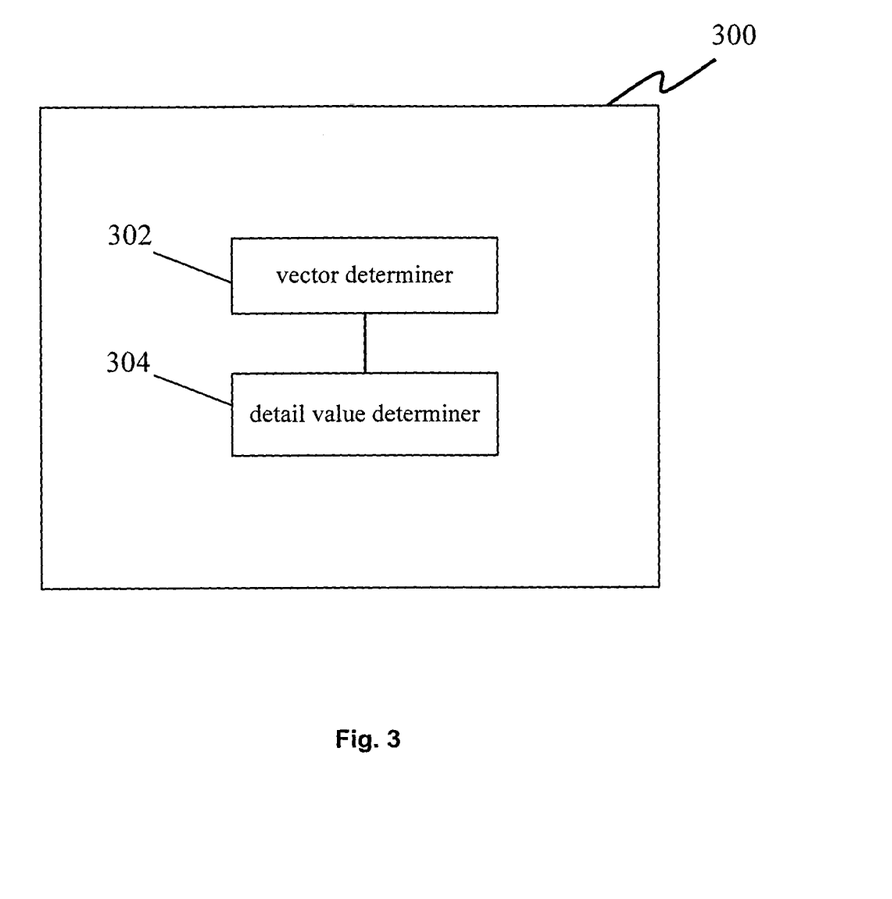
FIG. 3 shows a block diagram of a device for processing an image according to various embodiments.

FIG. 3 shows a block diagram of a device 300 for processing an input image according to various embodiments.

The device 300 is provided for processing an input image having a plurality of pixels, wherein each pixel has a pixel position.

The device 300 may include a vector determiner 302 configured to determine, for each pixel position, a vector based on the input image.

The device 300 may further include a detail value determiner 304 configured to determine, for each pixel position, a detail value for the pixel position based on the determined vectors at a plurality of neighboring pixel positions within a predetermined neighboring block of the pixel position.

The device 300 may be configured to process the input image according to various embodiments of the method as described above.

The method and device of various embodiments above can be used to extract fine details from a vector field. The various embodiments are based on the following two observations: 1) the details of an image are usually captured by its luminance variations; and 2) it is easy to generate the gradient field of its luminance, but more complex to calculate an image for a given vector field via solving the Possion Equation. From the various embodiments applied for fusion and de-noising of differently exposed LDR images as well as detail enhancement via multi-light images above, it is shown from these applications that 1) it is easier to use the filters of various embodiments to extract the desired fine details from a set of images; and 2) it is more flexible to use the filters of various embodiments to remove noise from an image in the sense that the filters of various embodiments can be used to reduce noise from selected areas of an image.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing an input image comprising a plurality of pixels, each pixel having a pixel position, the method comprising:
   for each pixel position, determining, by an image processing circuit, a vector based on the input image;
   for each pixel position, determining, by the image processing circuit, a detail value for the pixel position based on the determined vectors at a plurality of neighboring pixel positions within a predetermined neighboring block of the pixel position, and based on a first weighting factor and a second weighting factor; and
   outputting a detail image comprising the detail values determined for the pixel positions of the plurality of pixels;
   wherein the first weighting factor is determined based on the distance between the pixel position and each of the neighboring pixel positions, and the second weighting factor is determined based on the vectors at the neighboring pixel positions;
   wherein the second weighting factor further comprises a perceptual factor of the pixel position for which the detail value is determined, the perceptual factor being determined based on a variance of the predetermined neighboring block of each pixel position.

2. The method of claim 1, wherein determining the vector for each pixel position comprises:
   determining a gradient vector for a pixel at the pixel position of the input image based on intensity values of the input image; and
   modifying the gradient vector of the pixel at the pixel position to determine the vector for the pixel position.

3. The method of claim 1,
   wherein each vector comprises a horizontal vector component along a horizontal axis of the input image and a vertical vector component along a vertical axis of the input image; and
   wherein determining the detail value for each pixel position further comprises:
      for each neighboring pixel position, determining a sum vector value for each neighboring pixel position relative to the pixel position by summing the vertical vector components of a set of vertical pixel positions and the horizontal vector components of a set of horizontal pixel positions,
      wherein the set of vertical pixel positions comprises pixel positions between the neighboring pixel position and an intermediate pixel position having the same horizontal position as the neighboring pixel position and having the same vertical position as the pixel position, and the set of horizontal pixel positions comprises pixel positions between the intermediate pixel position and the pixel position.

4. The method of claim 3, wherein determining the detail value for each pixel position further comprises:
   determining the detail value for the pixel position to be a weighted average of the sum vector values for the plurality of neighboring pixel positions within the predetermined neighboring block of the pixel position using the first weighting factor and the second weighting factor,
   wherein the second weighting factor is determined based on the sum vector values for the neighboring pixel positions.

5. The method of claim 1, wherein the variance of the predetermined neighboring block of a pixel position is determined to be the maximum variance of the predetermined neighboring block of the same pixel position among a plurality of input images, the plurality of input images being captured with different exposure time.

6. The method of claim 1, wherein the perceptual factor of the pixel position, for which the detail value is determined, is determined based on a respective ratio between the variance of the predetermined neighboring block of the pixel position and the respective variance of the predetermined neighboring block of the pixel positions of the plurality of pixels.

7. The method of claim 1, further comprising:
   for each pixel position, determining a second vector based on a weighted average of the determined vectors at the plurality of neighboring pixel positions within the predetermined neighboring block of the pixel position; and
   for each pixel position, determining a detail value for the pixel position based on the determined vectors and the determined second vectors at the plurality of neighboring pixel positions within the predetermined neighboring block of the pixel position.

8. The method of claim 7, wherein for each pixel position, the second vector is determined based on at least one of the following:
   the distance between the pixel position and the respective neighboring pixel position, and
   the difference of the determined vectors at the pixel position and the respective neighboring pixel position.

9. The method of claim 7,
   wherein each of the determined vector comprises a horizontal vector component along a horizontal axis of the input image and a vertical vector component along a vertical axis of the input image; and
   wherein determining the detail value for each pixel position further comprises:
      for each neighboring pixel position, determining a sum vector value for each neighboring pixel position relative to the pixel position by summing the vertical vector components of a set of vertical pixel positions and the horizontal vector components of a set of horizontal pixel positions,
      wherein the set of vertical pixel positions comprises pixel positions between the neighboring pixel position and an intermediate pixel position having the same horizontal position as the neighboring pixel position and having the same vertical position as the pixel position, and the set of horizontal pixel positions comprises pixel positions between the intermediate pixel position and the pixel position;

for each neighboring pixel position, determining an auxiliary value based on the sum vector value for the neighboring pixel relative to the pixel position, and the second vector for the pixel position; and determining the detail value for the pixel position based on the auxiliary values at the plurality of neighboring pixel positions within the predetermined neighboring block of the pixel position.

10. The method of claim 9, wherein determining the detail value for each pixel position further comprises:

determining the detail value for the pixel position to be a weighted average of the auxiliary values determined for the plurality of neighboring pixel positions within the predetermined neighboring block of the pixel position using the first weighting factor, the second weighting factor and a third weighting factor, wherein the second weighting factor is determined further based on the auxiliary values for the neighboring pixel positions, and the third weighting factor is determined based on the second vectors at the pixel position and the neighboring pixel positions.

11. A device for processing an input image comprising a plurality of pixels, each pixel having a pixel position, the device comprising:

an image processing circuit comprising:

a vector determiner configured to determine, for each pixel position, a vector based on the input image; and a detail value determiner configured to determine, for each pixel position, a detail value for the pixel position based on the determined vectors at a plurality of neighboring pixel positions within a predetermined neighboring block of the pixel position, and based on a first weighting factor and a second weighting factor; and an output configured to output a detail image comprising the detail values determined for the pixel positions of the plurality of pixels;

wherein the first weighting factor is determined based on the distance between the pixel position and each of the neighboring pixel positions, and the second weighting factor is determined based on the vectors at the neighboring pixel positions;

wherein the second weighting factor further comprises a perceptual factor of the pixel position for which the detail value is determined, the perceptual factor being determined based on a variance of the predetermined neighboring block of each pixel position.

* * * * *